United States Patent
Horikawa et al.

(10) Patent No.: US 6,245,389 B1
(45) Date of Patent: Jun. 12, 2001

(54) METHOD FOR CIRCULATING ELECTROLESS NICKEL PLATING SOLUTION

(75) Inventors: Ken Horikawa; Muneo Mita, both of Tokyo; Hidehiro Nakao; Katsuhiro Tashiro, both of Saitama-ken, all of (JP)

(73) Assignees: Nippon Chemical Industrial Co., Ltd.; Meltex, Inc., both of Tokyo (JP)

( * ) Notice: Subject to any disclaimer, the term of this patent is extended or adjusted under 35 U.S.C. 154(b) by 0 days.

(21) Appl. No.: 09/125,778
(22) PCT Filed: Dec. 25, 1997
(86) PCT No.: PCT/JP97/04837
  § 371 Date: Aug. 26, 1998
  § 102(e) Date: Aug. 26, 1998

(30) Foreign Application Priority Data

Dec. 27, 1996 (JP) .................................................. 8-359093
Dec. 27, 1996 (JP) .................................................. 8-359094

(51) Int. Cl.$^7$ ................ B05D 1/18; C02F 1/42
(52) U.S. Cl. .............. 427/438; 427/98; 427/305; 427/443.1; 210/668; 210/688
(58) Field of Search ............ 427/98, 304, 305, 427/437, 438, 443.1; 210/668, 688

(56) References Cited

U.S. PATENT DOCUMENTS

| | | | |
|---|---|---|---|
| 4,303,704 | * 12/1981 | Courduvelis et al. | 427/345 |
| 5,112,392 | * 5/1992 | Anderson et al. | 106/1.22 |
| 5,609,767 | * 3/1997 | Eisenmann | 210/665 |

* cited by examiner

*Primary Examiner*—Brian K. Talbot
(74) *Attorney, Agent, or Firm*—Wenderoth, Lind & Ponack, LLP

(57) ABSTRACT

A method of circulating an electroless nickel plating solution is characterized in that the system comprises the following process steps effected in the following order: (A) a step of electrolessly plating nickel using a plating solution having nickel hypophosphite contained as a chief chemical material for supplying a plating metal ion $Ni^{2+}$ and a hypophosphorous acid ion $H_2PO_2^-$ acting as a reducing agent; (B) a step of removing $HPO_3^{2-}$ from a plating solution that has aged in the step (A); (C) a step of desalting the mother liquor separated from the step (B); and (D) a step of adjusting the components of the treated plating solution and then circulating same back into the step (A) of electroless nickel plating. According to the present invention, the plating solution is free from the formation and accumulation of a sulfuric acid salt and hence a long service life is ensured and a great advantage in environmental protection is provided.

4 Claims, 1 Drawing Sheet

METHOD FOR CIRCULATING ELECTROLESS NICKEL PLATING SOLUTION

TECHNICAL FIELD

The present invention relates to a method for circulating an electroless nickel plating solution in which an aged plating solution can be reused.

BACKGROUND ART

An electroless nickel plating solution has hitherto been generally composed of nickel sulfate as a nickel source in combination with sodium hypophosphite as a reducing agent. Sodium hydroxide or ammonium hydroxide has also been used to maintain the resulting plating solution at a predetermined pH level. When nickel is electrolessly plated using a plating solution of such composition, sodium sulfate is formed and, over time, accumulates in the plating solution. The sodium sulfate results from a reaction between a sodium phosphite derived from an oxidation of the sodium hypophosphite and a sulfate group derived from the nickel sulfate for use as the nickel source. This accumulation causes the plating solution to age, eventually inviting phenomena such as reduced plating speed, extraordinary deposition, deteriorated film quality and the like. Thus, after being used for a certain period of time the plating solution is replenished, for continuous use, with fresh liquid chemicals to thereby compensate for those components that have been used up. When in a state wherein both the sodium sulfate and the sodium phosphite are contained in high concentrations, the plating solution is not recycled and ultimately disposed in the ocean or the like as a waste liquid.

From the point of view of global environmental protection, however, the above mentioned plating solution waste has been banned from oceanic disposal since 1995 by the provisions of the London Dumping Treaty. Consequently, a demand has been voiced for the development of an electroless plating solution that affords prolonged service life or permits disposal with minimal environmental pollution.

Various attempts have been made to remove sodium phosphite and sodium sulfate which are built up during electroless nickel plating as discussed hereinbefore, but none of them are being practiced on a commercial basis. The methods which have been proposed for the removal of the sodium phosphite and sodium sulfate materials include, for instance, a method in which an electrolysis membrane is employed, a method in which an aluminum sheet or an aluminum foil is placed in an aged alkaline plating solution in such a method that nickel is deposited, followed by recovering the resultant nickel with nitric acid and then allowing a chelate resin to adsorb a portion of the remaining undeposited nickel in the mother liquor (Japanese Patent Laid-Open No. 51-6136); and a method in which nickel ions and sodium ions are separated from a plating solution in advance by an ion exchange resin such that sodium and nickel are separated from each other by adsorption into the ion exchange resin, the nickel alone being put back into the plating solution for subsequent reuse.

Still another method has been adopted in which part of an aged plating solution is disposed of and replaced with fresh liquid chemicals so as to extend the life time of the plating solution.

These, however, though likely to be regarded as rational processes in some respects, have too many economic and technological drawbacks to be suitable for practical application. Moreover, the method of partially substituting fresh liquid chemicals for an aged plating solution cannot be said to offer a fundamental solution to the problem.

Accordingly, the object of the present invention is to provide an industrially advantageous method which enables reuse of an aged electroless nickel plating solution. More particularly, the invention provides a method for circulating an electroless nickel plating solution which is as non-polluting as possible to the global environment.

DISCLOSURE OF THE INVENTION

In view of the prior art, the present inventors have done intensive research, and found that an aged plating solution can be reusable through which specific treatment processes carried out in a specific order, and completed the present invention.

That is to say, the present invention provides a method for circulating an electroless nickel plating solution, characterized in that the system comprises the following process steps effected in the following order:

(A) a step of electrolessly plating nickel using a plating solution containing nickel hypophosphite as a chief chemical material for supplying a plating metal ion $Ni^{2+}$ and a diphosphorous acid ion $H_2PO_2^-$ acting as a reducing agent;

(B) a step of removing $HPO_3^{2-}$ from a plating solution that has aged in the step (A);

(C) a step of desalting the mother liquor separated in the step (B); and (D) a step of adjusting the components of the treated plating solution and then circulating same back into the step (A) of electroless nickel plating.

Additionally, the present invention provides a system of circulating an electroless nickel plating solution, which further includes, prior to the step (B), a step wherein the plating solution having aged in the step (A) is treated with a chelate resin to thereby remove the $Ni^{2+}$.

Moreover, the present invention provides a system of circulating an electroless nickel plating solution, wherein the plating solution used in the step (A) further contains at least one member selected from the group consisting of a chelating agent, a buffering agent, a pH adjustor and a stabilizer.

Furthermore, the present invention provides a method of circulating an electroless nickel plating solution, wherein in the step (B) the pH of the plating solution having aged in the step (A) is adjusted to 6–9 with a calcium salt to thereby cause calcium phosphite to precipitate, and the precipitate is thereafter separated and removed.

The present invention also provides a method of circulating an electroless nickel plating solution wherein, in the step (C) the mother liquor derived from the step (B) is allowed to pass through an electrodialysis cell, a cation exchange resin, or a reverse osmosis membrane.

The present invention is directed to a method of circulating an electroless nickel plating solution wherein the system is essentially constituted by steps (A), (B), (C) and (D) performed in that order. Each of these steps is described hereinafter.

Figure 1:
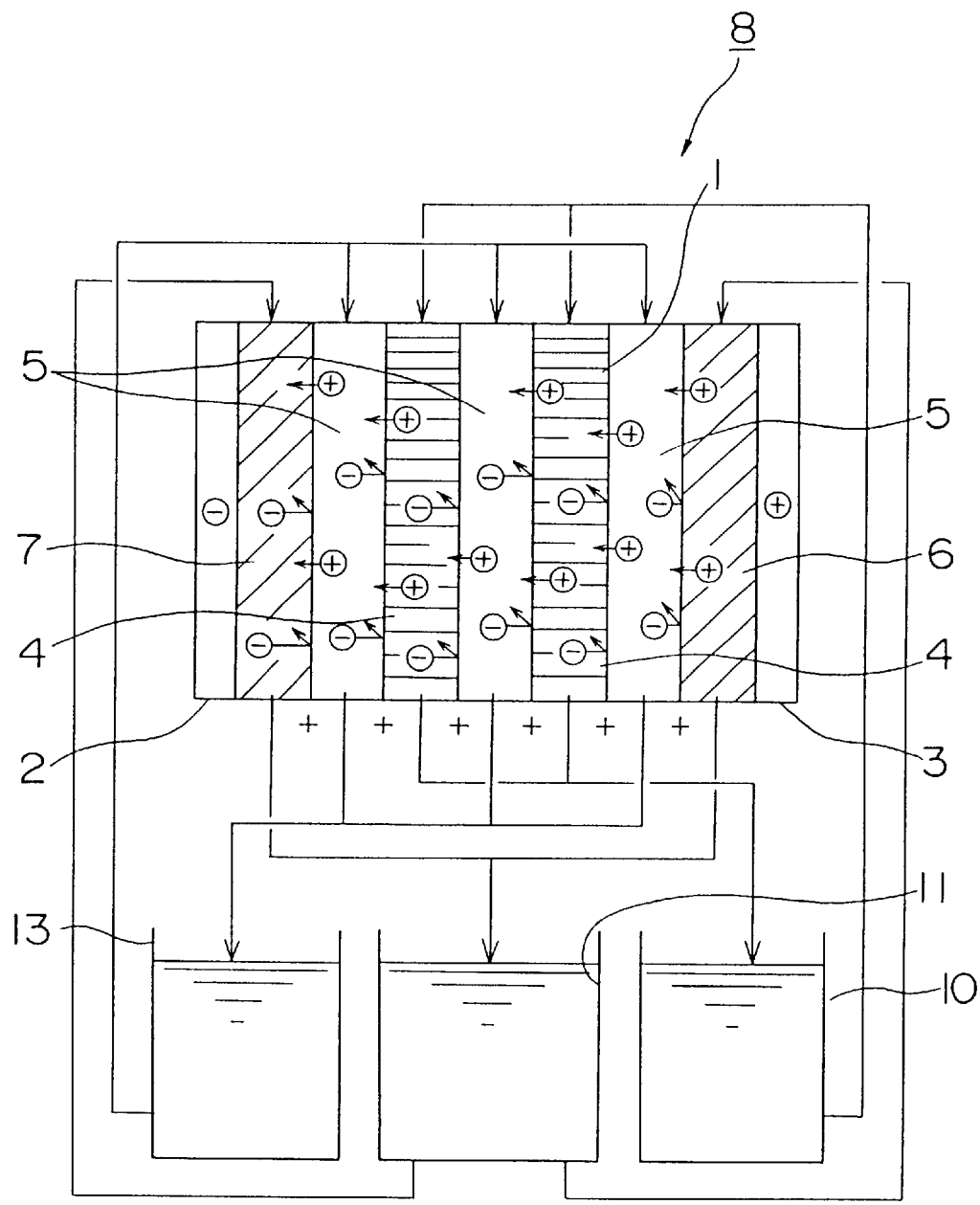
FIG. 1 is a schematic view showing an electric dialyzer used in a step (C) of Example 1 of the present invention.

Step (A) according to the invention concerns electroless nickel plating using a plating solution containing nickel hypophosphite as a chief chemical material for supplying a plating metal ion $Ni^{2+}$ and a hypophosphorous acid ion $H_2PO_2^-$ acting as a reducing agent. The nickel hypophosphite, added to the above plating solution and used as the chief chemical material for supplying a plating metal ion $Ni^{2+}$ and a hypophosphorous acid ion $H_2PO_2^-$ acting as a reducing agent, may be chosen from hydrated salt crystals such as penta- or hexa hydrates of nickel hypophosphites and the like. Among these, hexa hydrates of a nickel hypophosphite of the formula $Ni(H_2PO_2)_2 \cdot 6H_2O$ is preferred. Liquid nickel hypophosphites such as in an aqueous solution and the like are disadvantageous with regard to storage and transportation since the nickel hypophosphites are less soluble. Anhydrous nickel hypophosphites in particulate form are easily decomposable and hence undesirable.

Hydrous nickel hypophosphites may be produced, in a known method, by causing a source of nickel supply to react with a source of diphosphorous acid supply in an aqueous system to thereby form hydrated crystals, separating the hydrated crystals through crystallization, and subsequently by drying the crystals thus separated. More specifically, a crystal salt of hexa hydrated of a nickel hypophosphite is obtainable from a substitutional reaction of nickel chloride and sodium hypophosphite.

In the present invention, the term chief chemical material for supplying the $Ni^{2+}$ ion and $H_2PO_2^-$ ion as stated above is taken to denote a chemical material that can supply not only a $Ni^{2+}$ ion and a $H_2PO_2^-$ ion for use in preparing a plating bath, but also a $Ni^{2+}$ ion and a $H_2PO_2^-$ ion for use in replenishing the plating bath during continuous plating. It is desired that when being used for bath preparation and bath replenishment, a hydrated nickel diphosphite, added as such chemical material, be diluted in advance to a given concentration.

The above electroless nickel plating solution contains $Ni^{2+}$ ions in the range of 0.017–0.34 mol/liter and $H_2PO_2^-$ ions in the range of 0.017–1.0 mol/liter. Moreover, the molar ratio of $H_2PO_2^-/Ni^{2+}$ is preferably in the range of 1.0–4. When a high-temperature bath is used to effect plating at 80° C. or more, $Ni^{2+}$ is set in the range of 0.017–0.15 mol/liter and $H_2PO_2^-$ of 0.017–0.330 mol/liter. When a low-temperature bath is used to plate at from room temperature to about 60° C., $Ni^{2+}$ is set in the range of 0.095–0.34 mol/liter and $H_2PO_2^-$ of 0.095–0.472 mol/liter. In each case, the bath should preferably be controlled to meet the molar ratio noted above.

Desirably, the above electroless nickel plating solution contains, in addition to the essential components, one or more members selected from a chelating agent, a buffering agent, a pH adjustor and a stabilizer.

The chelating agent includes for example malic acid, lactic acid, citric acid, tartaric acid and amino acid which are all soluble in water, and also their respective salts. A calcium salt with a large difference in solubility among such compounds is preferred when reuse of the aged plating solution is considered. Any of these compounds may be used, or two or more of them may be combined. The buffering agent includes, for example, acetic acid, succinic acid and malonic acid and salts thereof, and such compounds may be used alone or in combination.

The pH value of the above electroless nickel plating solution is adjustable by means of a pH adjustor. An acidic bath can be adjusted to a pH range of 4.0–5.5 and an alkaline bath in a pH range of 8–10 with the use of an alkaline material such as ammonia, amine, caustic alkali and the like.

The stabilizer includes for example acetate salts and nitrate salts such as of lead, bismuth and thallium, certain types of sulfur compounds and the like. Such compounds may be used alone or in combination.

When found desirable, the above electroless nickel plating solution can be further admixed with auxiliary additives including brighteners, surfactants and the like commonly used in electroless nickel plating solutions.

The amounts of such additives to be used may be decided to suit particular applications.

When plating the surfaces of metal plates and inorganic powders with the electroless nickel plating solution specified above, it is desirable that the quantity of phosphorous acid ions formed as a by-product of the plating reaction be held within the range of 3–10 as determined by the molar ratio of $HPO_3^{2-}/Ni^{2+}$.

Continued plating under these conditions gives rise to an increased concentration of phosphorous acid ions and eventually ages and reduces the plating functions of the plating solution. No particular restrictions are placed on the aged composition of the plating solution. In this respect, however, one example may show that such an aged plating solution would, in most cases, have $Ni^{2+}$ in a content of 4–7 g/liter, $H_2PO_2^-$ in a content of 10–55 g/liter, $HPO_3^{2-}$ in a content of 80–160 g/liter, $SO_4^{2-}$ in a content of 30–75 g/liter, a chelating agent in a content of 30–55 g/liter, $Na^+$ in a content of 46–120 g/liter and a pH of 3.5–5.5.

Step (B) according to the present invention is intended to remove $HPO_3^{2-}$ from a plating solution that has aged in the step (A) stated above. Namely, a calcium salt is added in a powdered form or as an aqueous slurry to such aged plating solution in a reactor while stirring, and the pH of the resultant reaction system is thereafter adjusted to 6–9, preferably to 6.5–8.8, so that $HPO_3^{2-}$ can be precipitated and separated as calcium phosphite.

The above calcium salt is selected from, for example, calcium hydroxide, calcium carbonate and the like which may be used alone or in combination. Also, the amount of the calcium salt to be added is desirbly about the same as the amount of $HPO_3^{2-}$ contained in the aged plating solution to be treated.

Furthermore, the reason for pH adjustment to 6–9 is that a pH below 6 adversely leads to not only unreacted phosphorous acid ions but also to increased solubility of calcium phosphite during subsequent separation and removal of such acid ions, whereas a pH above 9 undesirably invites precipitated nickel ions as well as a re-increased solubility of calcium phosphite when separating and removing such nickel ion. In addition, temperatures used in treatment of the aged plating solution are not particularly restricted so long as they are 70° C. or lower. Temperatures below 10° C., however, are not preferable since they cause an extended reaction. Regarding the treatment time, the rate of reaction between an electroless nickel plating solution and a calcium salt is determined by the solubility of the latter salt, so ample time should necessarily be taken to form calcium phosphite. Hence, the reaction is desirably conducted with stirring for not less than 2 hours, preferably more than 20 hours.

Upon completion of the reaction, the treated plating solution is filtered at a temperature of 30° C. or lower to thereby separate and remove the calcium phosphite having been formed and precipitated. By means of this filtration, most of the phosphorous acid ions and of metallic impurities are removed from the aged plating solution. Though dependent on the type of the chelating agent contained in the aged plating solution is also partially precipitated as a calcium salt and removed. The removal treatment of $HPO_3^{2-}$ described above permits the $HPO_3^{2-}$ ion to be substantially removed. Depending on the solubility of the calcium phospite and the effect of the chelating agent, however, small portions of the $HPO_3^{2-}$ ions and of the calcium ions may remain dissolved in the corresponding mother liquor. It is desired, in this instance, that the calcium phosphite be separated and removed such that the calcium ion dissolved in the recovered mother liquor is held in a concentration of not higher than 0.12 g/liter. This prevents the resulting nickel film from becoming damaged when the recovered mother liquor is recycled for reuse. Thus, when it is necessary that the calcium phosphite be further dissolved and removed, the mother liquor derived from the above mentioned treatment is preferably concentrated with heat to allow the calcium phosphite to precipitate once again and the resulting precipitate is separated.

The calcium phosphite thus separated is recovered in a whitish particulate form and can be applied as a reducing agent, a resin additive, a pollution-free rust-proofing pigment or a functional material for various purposes.

Step (C) according to the present invention is a so-called desalting step provided to remove salts of $Na^+$, $NH_4^+$ and the like contained in the mother liquor separated in the above step (B). Cations such as $Na^+$, $NH_4^+$ and the like are mixed mainly by an alkaline material as a pH adjustor or a molar ratio adjustor used in a plating bath in the step (A).

In order to accomplish the desalting stated above, a method may be exemplified in which the mother liquor is treated by being passed through any one of an electrrodialysis cell, a cation exchange resin and a reverse osmosis membrane.

With regard to the electrodialysis cell, it is important that both sides of the dilution chambers are partitioned by use of cation exchange membranes. Such chambers may be constructed with a single cation exchange membrane, a plurality of cation exchange membranes, or a plurality of anion exchange membranes and cation exchange membranes. More specifically, as shown in FIG. 1, an electrodialysis cell 8 has a plurality of pairs of cation exchange membranes 1 assembled therein. As viewed from a cathode side 3, an anode chamber 6, a concentration chamber 5 and a dilution chamber 4 are disposed in that order, followed by alternate arrangement of another concentration chamber 5 and another dilution chamber 4. Still another concentration chamber 5 and a cathode chamber 7 are disposed in that order. The electrodialysis cell is further provided with a dilution tank 10 into which a mother liquor which is supplied to be treated is made to flow through the dilution chambers 4, an electrolyte tank 11 into which supplied electrolyte is made to flow through the anode chamber 6 and the cathode chamber 7, and a concentration tank 12 into which a liquor which is supplied to be concentrated is made to flow through the concentration chamber 5.

In FIG. 1, a mother liquor separated from the above step (B) is supplied, preferably in the range of 5–50 cm/second, to the dilution chambers 5 of the electrodialysis cell 10. In this instance, any suitable aqueous electrolyte may be put into the anode chamber 7 and the cathode chamber 8, two such chambers being located respectively at both ends of the electrodialysis cell 10. Current flow may be at a current density not beyond the critical current density, preferably in the range of 0.1–10 $A/dm^2$, and the cations contained in the above separated mother liquor, having been supplied to the dilution chamber 5, may be passed through the cation exchange membrane and selectively moved, into the concentration chamber 6. The cations, such as $Na^+$, $NH_4^+$ and the like, are consequently removed from that mother liquor. The cation exchange membrane is chosen, though not restrictively, from for example Selemion CMV (manufactured by Asahi Chemical Co.), Neoceptor CM-1 (manufactured by Tokuyama Soda Co.), Nafion 324 (manufactured by DuPont Co.) and the like. The anion exchange membrane is chosen, though not restrictively, from, for example, Selemion AMV (manufactured by Asahi Chemical Co.), Neoceptor AM-1 (manufactured by Tokuyama Soda Co.) and the like.

The cation exchange resins are not particularly restricted so long as a cation exchange group such as a sulfonic group, carboxylic group or the like are bonded thereto. For example, Diaion SK-1B (manufactured by Mitsubishi Chemical Co.) and the like may be used. The amount of the cation exchange resin to be used is usually larger than, preferably 2–5 times, the corresponding amount of waste liquid. The speed of treatment is usually 10–200 ml/min, preferably 50–100 ml/min.

As the material for the reverse osmosis membrane, a membrane of, for example, cellulose acetate, aromatic polyamide or polybenzimidazoline may be used. The pore diameter of the membrane is usually smaller than 100 angstroms, preferably 5–50 angstroms. The treatment pressure to be applied to the waste liquid is usually 0.5–100 $kg/m^2$, preferably 10–30 $kg/m^2$.

No particular restrictions are imposed on the method of operation for each such electrodialysis, cation exchange resin and reverse osmosis membrane. The type of operation that should be used can be decided in view of the composition of the separated liquid taken from step (B) and those conditions considered to be economical. After removal of the cations such as $Na^+$, $NH_4^+$ and the like, the pH of the liquid becomes lower than 5.5, preferably 4.5 or lower. Next, the liquid thus treated is transferred to a subsequent step (D).

The step (D) according to the present invention is provided to recycle the above treated liquid into the above mentioned electroless nickel plating step (A) after it has been adjusted with respect to the plating solution components. That is to say, the aged electroless nickel plating solution subjected to the above stated treatment is a hypophosphorous acid solution composed predominantly of $Ni^{2+}$ and a chelating agent. The composition of this acid solution is analyzed and, where needed, chemical materials such as nickel hypophosphite, a chelating agent, a pH adjustor, a stabilizer and the like are replenished. Hence, the solution is adjusted to have a composition suitable for use as a plating solution in the above step (A) and can be reused as a plating bath liquid, a working liquid or a replenishing liquid.

In the present invention, in advance of the above $HPO_3^{2-}$ removing step (B), a $Ni^{2+}$ removing step can be further provided to remove $Ni^{2+}$ with the use of a chelating resin, followed by effecting the $HPO_3^{2-}$ removing step (B). As a result, the calcium phosphite to be precipitated in step (B) is made easily obtained with a higher purity. Additionally, $Ni^{2+}$ captured by the chelating resin can be used as a starting material for the production of nickel hypophosphite. This is advantageous in that a valuable material can be recovered and reused.

In such $Ni^{2+}$ removing step, the aged plating solution derived from the above step (A) is treated by being passed through the chelating resin. Although the chelating resin is not limited, an imino diacetate type chelating resin is preferable because it is capable of selectively separating and removing $Ni^{2+}$, a divalent metal, from the aged plating solution.

The amount of the chelating resin to be used is preferably, in general, larger than 0.5 times the aged plating solution, more preferably 1–5 times. The speed of treatment of the aged plating solution is usually 10–100 ml/min, particularly 20–40 ml/min. Moreover, the pH of treatment is usually 4.5–5.5. The aged plating solution derived from step (A) usually has a pH range of 3.5–5.5 and hence may as such undergo treatment using the chelating resin. When the pH departs from the above range, the pH is desirably adjusted to 4.5–5.5. This treatment causes $Ni^{2+}$ to be replaceably captured from the aged plating solution which is thus made substantially free from such metal. $Ni^{2+}$ captured by the chelating resin is treated in conventional method with hydrochloric acid or sulfuric acid and then recovered as nickel chloride or nickel sulfate which can be reused as a starting material for nickel hypophosphite.

In the method of circulating an electroless nickel plating solution provided in accordance with the present invention, as described and shown hereinbefore, an aged plating solution can be effectively treated for reuse, and unlike the case where a sodium sulfate-containing plating solution is used, a smooth excellent film can be obtained. In particular, one noticeable advantage is that the plating bath is capable of exhibiting prolonged service life, or an increased number of so-called turns as compared to a conventional plating bath.

In the system of circulating an electroless nickel plating solution according to the present invention, the nickel plating step (A) is effected with use of a plating solution containing nickel hypophosphite as a chief chemical material for supplying plating metal ions $Ni^{2+}$ and $H_2PO_2^-$ acting as a reducing agent so that a sulfuric acid salt can be prevented from forming and accumulating during the plating operation. Further, even when the plating solution has a reduced plating capability as a result of repetitive plating operations, $HPO_3^{2-}$ contained in the aged plating solution can be precipitated and selectively substantially separated as calcium phosphite alone, as represented by the following equation, in step (B) wherein a calcium salt is put into the aged plating solution.

$$HPO_3^{2-} + Ca^{2+} \rightarrow CaHPO_3$$

In the step (C), low-molecular salts present in the aged plating solution such as $Na^+$, $NH_4^+$ and the like can be selectively removed. In the step (D), the treated solution is inspected and its composition is adjusted, if necessary, by replenishment of nickel hypophosphite, a chelating agent, a pH adjustor, a stabilizer and the like so that the resulting solution can be reused as a plating bath solution or a working solution.

In addition, prior to the step (B), $Ni^{2+}$ can be removed in a step provided to remove $Ni^{2+}$ by use of a chelating resin with the result that $Ni^{2+}$ captured by such resin is reusable as a starting material for producing nickel hypophosphite. More advantageously, calcium phosphite to be precipitated in the step (B) is easily obtainable in substantially nickel-free form and hence in high purity. This means the process is even more recovery and reuse of a valuable material.

BEST MODE OF CARRYING OUT THE INVENTION

The present invention will be further described with reference to several examples. These examples are to be considered illustrative, not restrictive.

EXAMPLE 1

Step (A)

In a 3 liter glass beaker, 2 liters of an electroless nickel plating solution was prepared composed of nickel hypophosphite hexahydrate in an amount of 30.3 g/liter, malic acid in an amount of 25 g/liter, succinic acid in an amount of 10 g/liter and lead nitrate in an amount of 2 mg/liter and with a pH of 4.5. After the resulting plating solution was heated to 90° C., 10 degreased and pickled iron pieces (5 cm×10 cm×0.2 mm) were immersed for a time in the solution, followed by electroless nickel plating of the iron pieces for 30 minutes. Then, the iron pieces were replaced with fresh counterparts which were treated in a like method, similar treatments being effected a total of 16 times. During the plating treatment, those chemicals (mainly nickel hypophosphite) spent by the plating reaction were replenished every 30 minutes. Aqueous sodium hydroxide was normally replenished to maintain the pH of the solution at 4.5, and deionized water was replenished to compensate for evaporated water. By this electroless nickel plating treatment, nickel-plated films were deposited on the iron pieces. The films had a maximum thickness of 8.3 μm, a minimum thickness of 7.6 μm and an average thickness of 8.0 μm. All of the resultant plated layers were smooth and had an excellent metallic luster. The composition of the plating solution, aged after completion of the plating treatment, is shown in Table 1.

Step (B)

Into 2 liters of the aged plating solution (pH 3.6, solution temperature 70° C.) derived from the step (A) was put calcium hydroxide to adjust the pH to 6.1–8.0, and the resultant solution was held at room temperature for 24 hours. After treatment, a white precipitate formed from substitution was filtered in a conventional method at a temperature of not higher than 30° C. to thereby separate and remove calcium phosphite. The composition of the mother liquor after filtration is shown in Table 1.

Step (C)

Subsequently, 1 liter of the treated mother liquor was placed in an electrodialysis cell (see FIG. 1) that had been constructed with 6 sheets of a cation exchange membrane, Selemion CMV (manufactured by Asahi Glass Co.), such membrane having an effective area of 150 cm². The direct current and voltage applied to the electrodialysis cell were 5 A and 10 V, respectively. The composition of the liquor after the electrodialysis treatment is shown in Table 1.

Step (D) and Repeated Step (A)

To 1 liter of the treated mother liquor obtained above were added 30 g of nickel hypophosphite hexahydrate, 20 g of sodium diphosphite monohydrate, 24.8 g of malic acid, 9.5 g of succinic acid and 2 mg of lead nitrate, and the entire mixture was further adjusted with purified water up to a total volume of 2 liters, whereby a plating solution was prepared. Thereafter, the pH of the plating solution of the above composition was adjusted to 4.5 and the plating solution was put into a 3 liter glass beaker to be used as a bath. After the plating solution was heated to 90° C., 10 degreased and pickled iron pieces (5 cm×10 cm×0.2 mm) were immersed for a time in such solution, followed by electroless nickel plating of the iron pieces for 30 minutes. Like treatments were conducted a total of 16 times. During the plating treatment, those chemicals (mainly nickel hypophosphite) spent by the plating reaction were replenished every 30 minutes. Sodium hydroxide solution was normally replenished to maintain the pH of the solution at 4.5, and deionized water was replenished to compensate for evaporated water.

By the above electroless nickel plating treatment, nickel-plated films were deposited on the iron pieces. The films had a maximum thickness of 8.2 μm, a minimum thickness of 7.4 μm and an average thickness of 7.8 μm. The resultant plated layers were all smooth and had an excellent metallic luster. Such plated products have been found favorably comparable to those obtained by use of the initially prepared plating bath.

TABLE 1

| component of mother liquor | content (g/liter) | | |
|---|---|---|---|
| | after completion of step A | after completion of step B | after completion of step C |
| $Ni^{2+}$ | 5.8 | 5.6 | 5.6 |
| $H_2PO_2^-$ | 13.1 | 14.2 | 14.0 |
| $HPO_3^{2-}$ | 101.1 | 0.13 | 0.15 |
| malic acid | 27.3 | 25.5 | 25.2 |

TABLE 1-continued

| component of mother liquor | content (g/liter) | | |
|---|---|---|---|
| | after completion of step A | after completion of step B | after completion of step C |
| succinic acid | 11.1 | 11.6 | 10.5 |
| iron ion | 0.064 | 0.002 | 0.003 |
| Ca ion | — | 0.098 | 0.102 |

EXAMPLE 2

Step (A)

The procedure of Example 1 was followed except that sodium hypophosphite monohydrate was further added in an amount of 5 g/liter, and lead nitrate was added in an amount of 1 mg/liter in place of an amount of 2 mg/liter. Thus, a plating solution was prepared, and electroless nickel plating was likewise effected. By the above electroless nickel plating treatment, nickel-plated films were deposited on the iron pieces. The films had a maximum thickness of 10.3 $\mu$m, a minimum thickness of 9.1 $\mu$m and an average thickness of 9.6 $\mu$m. The resultant plated layers were all smooth and had an excellent metallic luster. In Table 2, the composition of the plating solution aged after completion of the plating treatment is shown.

Step (B)

The same step (B) in Example 1 was repeated. The composition of the mother liquor after filtration in the step (B) is shown in Table 2.

Step (C)

Next, desalting was effected by feeding 1 liter of the treated mother liquor into a column (aperture 7.5 cm×length 60 cm) at a flow rate of 90 ml/min by means of a pump, the column being filled with 2 liters of a cation exchange resin (Diaion SK-1B, manufactured by Mitsubishi Chemical Co.). Then, the resultant liquor was transferred to a subsequent plating treatment cell. The composition of the liquor after treatment with the cation exchange resin is shown in Table 2.

Step (D) and Repeated Step (A)

To 1 liter of the treated mother liquor of the above composition were added 60 g of nickel hypophosphite hexahydrate, 26 g of malic acid, 10 g of succinic acid and 4 mg of lead nitrate. The entire mixture was further adjusted with purified water up to a total volume of 2 liters so that a plating solution was prepared. Plating, subsequent to preparation of the plating solution, was performed as in Example 1. By this electroless nickel plating treatment, nickel-plated films were deposited on the iron pieces. The films had a maximum thickness of 10.0 $\mu$m, a minimum thickness of 8.8 $\mu$m and an average thickness of 9.3 $\mu$m. The resultant plated layers were all smooth and had an excellent metallic luster. Such plated products have been found favorably comparable to those obtained by use of the initially prepared plating bath.

TABLE 2

| component of mother liquor | content (g/liter) | | |
|---|---|---|---|
| | after completion of step A | after completion of step B | after completion of step C |
| $Ni^{2+}$ | 5.8 | 5.7 | 0.5 |
| $H_2PO_2^-$ | 13.2 | 13.0 | 15.2 |
| $HPO_3^{2-}$ | 101.5 | 0.14 | 0.112 |
| malic acid | 27.5 | 25.6 | 24.2 |
| succinic acid | 11.2 | 10.3 | 10.6 |
| iron ion | 0.064 | 0.002 | 0.001 |
| Ca ion | — | 0.098 | 0.090 |

EXAMPLE 3

Step (A)

The procedure of Example 1 was followed except that sodium hypophosphite monohydrate was further added in an amount of 10 g/liter. Thus, a plating solution was prepared, and electroless nickel plating was likewise effected. By this electroless nickel plating treatment, nickel-plated films were deposited on the iron pieces. The films had a maximum thickness of 10.8 $\mu$m, a minimum thickness of 9.7 $\mu$m and an average thickness of 10.3 $\mu$m. The resultant plated layers were all smooth and had an excellent metallic luster. In Table 3, the composition of the plating solution aged after completion of the plating treatment is shown.

Step (B)

The same step (B) in Example 1 was repeated. The composition of the mother liquor after filtration in the step (B) is shown in Table 3.

Step (C)

Next, desalting was effected by passing 1 liter of the treated mother liquor through a reverse osmosis membrane at a pressure of 30 kg/cm$^2$. Then, the resultant liquor was transferred to a subsequent plating treatment cell. The composition of the liquor after passage through the reverse osmosis membrane is shown in Table 2.

Step (D) and Repeated Step (A)

To 1 liter of the treated mother liquor of the above composition were added 900 ml of purified water and 30 g of nickel hypophosphite hexahydrate, 34 g of sodium hypophosphite monohydrate, 9.2 g of malic acid, 11.7 g of succinic acid and 2 mg of lead nitrate, whereby a plating solution was prepared. Plating, subsequent to preparation of the plating solution, was performed as in Example 1. By this electroless nickel plating treatment, nickel-plated films were deposited on the iron pieces. The films had a maximum thickness of 10.5 $\mu$m, a minimum thickness of 9.5 $\mu$m and an average thickness of 9.9 $\mu$m. The resultant plated layers were all smooth and had an excellent metallic luster. Such plated products have been found favorably comparable to those obtained by use of the initially prepared plating bath.

TABLE 3

| component of mother liquor | content (g/liter) | | |
|---|---|---|---|
| | after completion of step A | after completion of step B | after completion of step C |
| $Ni^{2+}$ | 5.6 | 5.6 | 5.6 |
| $H_2PO_2^-$ | 13.5 | 14.2 | 11.9 |
| $HPO_3^{2-}$ | 101.2 | 0.135 | 0.117 |
| malic acid | 27.5 | 25.4 | 34.2 |

TABLE 3-continued

| component of mother liquor | content (g/liter) | | |
|---|---|---|---|
| | after completion of step A | after completion of step B | after completion of step C |
| succinic acid | 11.5 | 11.6 | 8.3 |
| iron ion | 0.064 | 0.002 | 0.002 |
| Ca ion | — | 0.098 | 0.011 |

EXAMPLE 4

Step (A)

In a 3 liter glass beaker, 2 liters of an electroless nickel plating solution was prepared composed of nickel hypophosphite hexahydrate in an amount of 30.3 g/liter, sodium hypophosphite monohydrate in an amount of 10.8 g/liter, malic acid in an amount of 25 g/liter, succinic acid in an amount of 10 g/liter and lead nitrate in an amount of 2 mg/liter and with a pH of 4.5. After the resulting plating solution was heated to 90° C., 10 degreased and pickled iron pieces (5 cm×10 cm×0.2 mm) were immersed for a time in such solution, followed by electroless nickel plating of the iron pieces for 30 minutes. Then, the iron pieces were replaced with fresh counterparts which were treated in like method, and like treatments were effected a total of 16 times. During the plating treatment, those chemicals (mainly nickel diphosphite) spent by the plating reaction were replenished every 30 minutes. Sodium hydroxide solution was normally replenished to maintain the pH of the solution at 4.5, and deionized water was replenished to compensate for evaporated water. By this electroless nickel plating treatment, nickel-plated films were deposited on the iron pieces. The films had a maximum thickness of 10.9 μm, a minimum thickness of 9.9 μm and an average thickness of 10.5 μm. All of the resultant plated layers were smooth and had an excellent metallic luster. In Table 4, the composition of the plating solution aged after completion of the plating treatment is shown.

Step ($Ni^{2+}$ Removal)

$Ni^+$ removal was effected by feeding 2 liters of the above aged plating solution into a column (aperture 7.5 cm×length 60 cm) at a flow rate of 40 ml/min by means of a pump, the column being filled with 2 liters of an imino diacetate type chelete resin. The resultant solution was transferred to a treatment cell of step (B). The ratio of $Ni^{2+}$ capture at that time was 99%.

Step (B)

Into 2 liters of the $Ni^{2+}$ removal-treated solution (pH 3.6, solution temperature 70° C.) was put calcium hydroxide to adjust the pH to 6.1–8.0, and the resultant solution was held at room temperature for 24 hours. After treatment, a white precipitate formed from substitution was filtered in a conventional method at a temperature of not higher than 30° C. to thereby separate and remove calcium phosphite. The composition of the mother liquor after filtration is shown in Table 4.

Step (C)

Subsequently, 1 liter of the treated mother liquor was placed in an electrodialysis cell that had been constructed with 5 sheets of a cation exchange membrane, Selemion CMV (manufactured by Asahi Glass Co.), and 1 sheet of an anion exchange membrane, Selemion AMV (manufactured by Asahi Glass Co.), each such membrane having an effective area of 150 $cm^2$. The direct current and voltage applied to the electrodialysis cell were 5 A and 10 V, respectively. The composition of the liquor after the electrodialysis treatment is shown in Table 4.

Step (D) and Repeated Step (A)

To 1 liter of the treated mother liquor obtained above were added 60 g of nickel hypophosphite hexahydrate, 20 g of sodium hypophosphite monohydrate, 24.8 g of malic acid, 9.5 g of succinic acid and 2 mg of lead nitrate, and the entire mixture was further adjusted with purified water up to a total volume of 2 liters, whereby a plating solution was prepared. Thereafter, the pH of the plating solution of the above composition was adjusted to 4.5 and put into a 3 liter glass beaker to be use as a bath. After the plating solution was heated to 90° C., 10 degreased and pickled iron pieces (5 cm×10 cm×0.2 mm) were immersed for a time in such solution, followed by electroless nickel plating of the iron pieces for 30 minutes. Like treatments were conducted a total of 16 times. During the plating treatment, those chemicals (mainly nickel hypophosphite) spent by the plating reaction were replenished every 30 minutes. Sodium hydroxide solution was normally replenished to maintain the pH of the solution at 4.5, and deionized water was replenished to compensate for evaporated water.

By the above electroless nickel plating treatment, nickel-plated films were deposited on the iron pieces. The films had a maximum thickness of 10.4 μm, a minimum thickness of 9.6 μm and an average thickness of 10.1 μm. The resultant plated layers were all smooth and had an excellent in metallic luster. Such plated products have been found favorably comparable to those obtained by use of the first-prepared plating bath.

TABLE 4

| component of mother liquor | content (g/liter) | | |
|---|---|---|---|
| | after completion of step A | after completion of step B | after completion of step C |
| $Ni^{2+}$ | 5.8 | — | — |
| $H_2PO_2^-$ | 13.2 | 14.2 | 14.0 |
| $HPO_3^{2-}$ | 101.2 | 0.13 | 0.17 |
| malic acid | 27.1 | 25.4 | 25.2 |
| succinic acid | 11.0 | 10.9 | 10.5 |
| iron ion | 0.067 | 0.002 | 0.003 |
| Ca ion | — | 0.098 | 0.102 |

EXAMPLE 5

Step (A)

The plating treatment of Example 4 was followed except that sodium hypophosphite monohydrate was added in an amount of 6.7 g/liter in place of an amount of 10.8 g/liter, and in piece of 3 liter glass beaker in which 2 liters of an electroless nickel plating solution was prepared in a 5 liter glass beaker, 4 liters of an electroless nickel plating solution was prepared. By this electroless nickel plating treatment, nickel-plated films were deposited on the iron pieces. The films had a maximum thickness of 10.4 μm, a minimum thickness of 9.3 μm and an average thickness of 9.8 μm. All of the resultant plated layers were smooth and had an excellent metallic luster. In Table 5, the composition of the plating solution aged after completion of the plating treatment is shown.

Step ($Ni^{2+}$ Removal) and Step (B)

The same step ($Ni^{2+}$ removal) and step (B) in Example 4 were repeated. The composition of the mother liquor after filtration in the step (B) is shown in Table 5.

Step (C)

Next, desalting was effected by feeding 1 liter of the treated mother liquor into a column (aperture 7.5 cm×length 60 cm) at a flow rate of 90 ml/min by means of a pump, the column being filled with 2 liters of a cation exchange resin (Diaion SK-1B, manufactured by Mitsubishi Chemical Co.). Then, the resultant liquor was transferred to a subsequent plating treatment cell. The composition of the liquor after treatment with the cation exchange resin is shown in Table 5.

Step (D) and Repeated Step (A)

The procedure of Example 4 was followed except that the amount of malic acid was changed from 24.8 g to 26 g. By the above electroless nickel plating treatment, nickel-plated films were deposited on the iron pieces. The films had a maximum thickness of 10.0 μm, a minimum thickness of 8.9 μm and an average thickness of 9.5 μm. The resultant plated layers were all smooth and had an excellent metallic finish. Such plated products have been found favorably comparable to those obtained by use of the intially-prepared plating bath.

TABLE 5

| component of mother liquor | content (g/liter) | | |
|---|---|---|---|
| | after completion of step A | after completion of step B | after completion of step C |
| $Ni^{2+}$ | 5.8 | — | — |
| $H_2PO_2^-$ | 13.2 | 12.7 | 15.1 |
| $HPO_3^{2-}$ | 101.2 | 0.135 | 0.110 |
| malic acid | 27.5 | 26.2 | 24.0 |
| succinic acid | 11.3 | 11.5 | 10.5 |
| iron ion | 0.065 | 0.002 | 0.001 |
| Ca ion | — | 0.098 | 0.090 |

EXAMPLE 6

Step (A)

The plating treatment of Example 4 was followed except that sodium hypophosphite monohydrate was added in an amount of 16.2 g/liter in place of an amount of 10.8 g/liter. By this electroless nickel plating treatment, nickel-plated films were deposited on the iron pieces. The films had a maximum thickness of 10.8 μm, a minimum thickness of 10.2 μm and an average thickness of 10.6 μm. All of the resultant plated layers were smooth and had an excellent metallic luster. In Table 6, the composition of the plating solution aged after completion of the plating treatment is shown.

Step ($Ni^{2+}$ Removal) and Step (B)

The same step ($Ni^{2+}$ removal) and step (B) in Example 4 were repeated. The composition of the mother liquor after filtration in the step (B) is shown in Table 6.

Step (C)

Next, desalting was effected by passing 1 liter of the treated mother liquor through a reverse osmosis membrane at a pressure of 30 kg/cm². Then, the resultant liquor was transferred to a subsequent plating treatment cell. The composition of the liquor after passage through the reverse osmosis membrane is shown in Table 6.

Step (D) and Repeated Step (A)

To 1 liter of the treated mother liquor of the above composition were added 900 ml of purified water and also 60 g of nickel hypophosphite hexahydrate, 34 g of sodium hypophosphite monohydrate, 9.2 g of malic acid, 11.7 g of succinic acid and 4 mg of lead nitrate, whereby a plating solution was prepared. Plating, subsequent to preparation of the plating solution, was performed as in Example 4. By this electroless nickel plating treatment, nickel-plated films were deposited on the iron pieces. The films had a maximum thickness of 10.4 μm, a minimum thickness of 9.8 μm and an average thickness of 10.1 μm. The resultant plated layers were all smooth and had an excellent metallic luster. Such plated products have been found favorably comparable to those obtained by use of the initially prepared plating bath.

TABLE 6

| component of mother liquor | content (g/liter) | | |
|---|---|---|---|
| | after completion of step A | after completion of step B | after completion of step C |
| $Ni^{2+}$ | 5.8 | — | — |
| $H_2PO_2^-$ | 13.2 | 14.3 | 11.9 |
| $HPO_3^{2-}$ | 101.3 | 0.14 | 0.117 |
| malic acid | 27.2 | 25.1 | 34.2 |
| succinic acid | 11.2 | 11.7 | 8.3 |
| iron ion | 0.065 | 0.003 | 0.002 |
| Ca ion | — | 0.097 | 0.110 |

INDUSTRIAL APPLICABILITY

In the method of circulating an electroless nickel plating solution according to the present invention, no sulfuric acid salt forms and accumulates in the plating solution which, therefore, ensures prolonged service life. Furthermore, low-molecular cations such as $HPO_3^{2-}$, $Na^-$ and the like are separable and removable, in a remarkably industrially advantageous way, from a plating solution aged by repeated use, and the aged plating solution is thus made reusable. In addition, plating treatment using the treated and reused plating solution is capable of forming a plated film that is favorably comparable to those resulting from an initially prepared plating solution. In particular, and advantageously, when $Ni^{2+}$ removal is effected by use of a chelating resin prior to $HPO_3^{2-}$ removal, a valuable material can be recovered and reused from the aged plating solution. Consequently, the method of circulating an electroless nickel plating solution according to the present invention is greatly advantageous as a plating solution circulating method that minimizes pollution of the environment.

What is claimed is:

1. A method of circulating an electroless nickel plating solution, which method comprises the following sequential process steps:

(A) electrolessly plating nickel by use of a plating solution having nickel hypophosphite contained as a chief chemical material for supplying a plating metal ion $Ni^{2+}$, and a hypophosphorous acid ion $H_2PO_2^-$ acting as a reducing agent;

(B) removing $HPO_3^{2-}$ from the plating solution that has aged in step (A);

(C) separating a mother liquor from step (B), and then desalting the mother liquor separated in step (B) by passing it through an electrodialysis cell, cation exchange resin or reverse osmosis membrane; and (D) adjusting the components of the treated plating solution of step (C) and then circulating them back into step (A) for electroless nickel plating, wherein, in step (B), the pH of the plating solution having aged in step (A) is adjusted to 6–9 with a calcium salt to cause calcium phosphite to precipitate, and the precipitate is thereafter separated and removed.

2. The method of circulating an electroless nickel plating solution according to claim 1, which further includes, prior to step (B), a step wherein the plating solution having aged in step (A) is treated with a chelate resin to remove the $Ni^{2+}$.

3. The method of circulating an electroless nickel plating solution according to claim 1, wherein the plating solution used in step (A) further contains at least one member selected from the group consisting of a chelating agent, a buffering agent, a pH adjustor and a stabilizer.

4. The method of circulating an electroless nickel plating solution according to claim 2, wherein the plating solution used in step (A) further contains at least one member selected from the group consisting of a chelating agent, a buffering agent, a pH adjuster and a stabilizer.

* * * * *